Dec. 18, 1951  L. STANTON  2,579,277
MEASURING APPARATUS
Filed July 30, 1949

*INVENTOR.*
LEONARD STANTON
BY
ATTORNEY.

Patented Dec. 18, 1951

2,579,277

UNITED STATES PATENT OFFICE 2,579,277

MEASURING APPARATUS

Leonard Stanton, Philadelphia, Pa., assignor to Minneapolis-Honeywell Regulator Company, Minneapolis, Minn., a corporation of Delaware Application July 30, 1949, Serial No. 107,706

7 Claims. (Cl. 320—1)

The general object of the present invention is to provide improved conversion mechanism suitable for inclusion in measuring systems of the capacity-rebalancing type adapted for use in measuring thermocouple voltages and other small unidirectional voltages.

In capacity-rebalancing measuring apparatus of the type to which the invention pertains, the voltage to be measured is compared with the voltage of a standard cell.

In effecting the comparison, the source of voltage measured and the standard cell, or other source of the fixed comparison voltage, are each connected into and disconnected from a measuring circuit in rapid alternation, the frequency of alternation usually being 60 cycles per second. The measuring circuit includes a capacitor of fixed capacity, and a variable or adjustable capacitor, the capacity of which is varied by its adjustment. When the apparatus is in its balanced condition, the product of the voltage to be measured and the capacity of one of the two capacitors is equal to the product of the standard or comparison voltage and the capacity of the other capacitor. When the apparatus is unbalanced, said products are unequal, but a suitable adjustment of the capacity of the rebalancing capacitor will make the two products equal and thus rebalance the system. In the balanced condition of the apparatus, the adjustment position of the adjustable rebalancing capacitor provides a measure of the voltage to be measured.

In the arrangements heretofore proposed, the conversion mechanism employed in a capacity rebalancing apparatus has customarily included a vibrator unit directly associated with the source of voltage to be measured and a second vibrator unit directly associated with the standard, or comparison voltage source.

A specific object of the present invention is to provide conversion mechanism which may comprise separate vibrator units for the voltage to be measured, and for the standard cell, as has been heretofore customary, or which may comprise a single vibrator associated with the two sources of voltage, and in which each of the two vibrating contacts or reeds of the first arrangement, or the single vibrating contact or reed of the second arrangement, is connected to ground. The grounding of the vibrating contact or contacts contributes to structural and operational simplicity and reliability and has the special advantage of reducing electrostatic pick-up which is a source of measurement error.

The various features of novelty which characterize my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described preferred embodiments of the invention.

Figure 1:
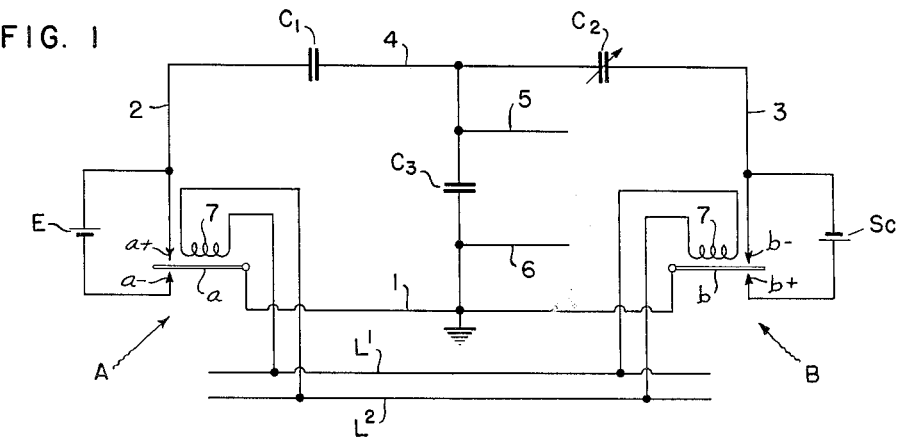
Fig. 1 is a diagram illustrating one embodiment of the invention.

In the embodiment of the invention illustrated diagrammatically in Fig. 1, a vibrator unit A is associated with the source E of the voltage to be measured, and a second vibrator unit B is associated with a standard cell Sc, which forms the source of the constant comparison voltage. As diagrammatically shown, the unit A comprises a vibrating contact or reed $a$ which vibrates between and alternately engages relatively stationary contacts $a+$ and $a-$ respectively connected to the positive and negative terminals of the source E of the voltage to be measured. In many cases that voltage source is a thermocouple. The vibrator unit B which may be, and as shown is, similar to the unit A, comprises a vibrating contact or reed $b$ which vibrates between and alternately engages relatively stationary contacts $b+$ and $b-$, respectively connected to the positive and negative terminals of the standard cell Sc. The vibrating contacts $a$ and $b$ are each connected to ground. As shown, the ground connection comprises a common grounding conductor 1 to which each of said contacts is connected.

In Fig. 1, the contact $a+$ and the positive terminal of the voltage source E are connected by a conductor 2 to one plate of a capacitor $C_1$, and the contact $b-$ and the negative terminal of the standard cell Sc are connected by a conductor 3 to one plate of an adjustable capacitor $C_2$. The second plates or terminals of capacitors $C_1$ and $C_2$ are connected by a conductor 4. As shown in Fig. 1, the capacitor $C_1$ is of fixed capacity, while the capacitor $C_2$ serves as the rebalancing capacitor of adjustable capacity. The conductors 1 and 4 are connected through an impedance shown as a condenser $C_3$. When the conductors 1 and 4 differ in potential, signal pulses are developed across the condenser $C_3$. Those signal pulses may be transmitted by the conductors 5 and 6 to the voltage amplifying and motor driving mechanism of known type for varying the capacity of the adjustable rebalancing capacitor $C_2$, as required to make the charge on that capacitor equal to the charge on capacitor $C_1$, and thus eliminate the potential difference between the conductors 1 and 4. When the capacitor $C_2$ is thus adjusted to balance the measuring apparatus, the adjustment position or condition of the capacitor $C_2$ provides a measure of the voltage E. The mechanism (not shown) for adjusting the capacitor $C_2$ may well be similar to the mechanism for adjusting a measuring bridge circuit which is disclosed and claimed in the Wills Patent 2,423,540 of July 8, 1947.

In Fig. 1, the vibrating contacts or reeds $a$ and $b$ of the vibrator units A and B, are each vibrated by an alternating current flow through a coil 7 individual to the reed and energized by alternating current supply conductors $L'$ and $L^2$. Customarily, the reeds or contacts $a$ and $b$ are polarized so that their vibration frequency is the same as the frequency of alternation of the current supplied by conductors $L'$ and $L^2$, which ordinarily is 60 cycles per second. In Fig. 1, the alternate up and down movements of the contacts $a$ and $b$ are in synchronism. When the contact $a$ turns downward into engagement with the contact $a-$, it connects the voltage source E into the circuit including the two capacitors $C_1$ and $C_3$ between ground and the capacitor $C_1$. When the contact $b$ turns downward into engagement with the contact $b+$, it connects the standard cell Sc into said circuit between ground and the capacitor $C_2$.

When the voltage sources E and Sc are thus connected to the capacitors $C_1$ and $C_2$, the voltage source E puts a positive charge on the capacitor $C_1$, and the standard cell Sc puts a negative charge on the capacitor $C_2$. When the capacitors $C_1$ and $C_2$ are thus oppositely charged, each discharges into the other through the conductors 4 and 1. When the measuring system is in balance, the charge which is received and given out by each capacitor is equal to the charge received and given out by the other, and the potential of the conductor 4 remains equal to the potential of the ground conductor 1. When the charge given the capacitor $C_1$ by the voltage source E is greater than the charge simultaneously given the capacitor $C_2$ by the voltage source Sc, the negative current flow into the conductor 4 from the capacitor $C_1$ will exceed the positive current flow into the conductor 4 from the capacitor $C_2$, and the potential of the conductor 4 will fall below the potential of the conductor 1 and will result in the passage of a negative signal pulse through the conductor 5 and the passage of a positive signal pulse through the conductor 6.

When the vibrating contacts $a$ and $b$ separate from the contacts $a-$ and $b+$ and turn upward into engagement with the contacts $a+$ and $b-$, respectively, the positive charge on the capacitor $C_1$ and the negative charge on the capacitor $C_2$ are rapidly attenuated. In consequence, when the contacts $a$ and $b$ again engage the contacts $a-$ and $b+$, respectively, the positive charging of the capacitor $C_1$ and the negative charging of the capacitor $C_2$, and the transmission of signal pulses by conductors 5 and 6, will be repeated, unless the system has been rebalanced in the meantime. Such rebalance if effected, may be due to one or to the other partly of each of two changes, namely, a change in the magnitude of the source E, and an adjustment change in the capacity of the capacitor $C_2$. The above described unbalance of the apparatus which resulted in lowering the potential of the conductor 4 below the ground potential may be explained as due to the fact that the capacity of the capacitor $C_2$ was small so that the negative charge given the capacitor $C_2$ by the standard cell Sc, was smaller than the positive charge given the capacitor $C_1$ by the voltage source E. A decrease in the magnitude of the voltage of the source E, or a capacity increasing adjustment of the capacitor $C_2$, or both changes are necessary to make the charges on the two capacitors equal and thereby rebalance the apparatus.

When the apparatus is unbalanced as a result of a decrease in the voltage of the source E, the negative charge next given the capacitor $C_2$ will exceed the positive charge simultaneously given the capacitor $C_1$. In consequence, the positive discharge from the capacitor $C_2$ into the conductor 4 will exceed the negative discharge into that conductor from the capacitor $C_1$, and the potential of the conductor 4 will become positive relative to the ground potential. The conductor 4 will then give a positive charge to the capacitor $C_3$, and the signal pulses then transmitted by the conductors 5 and 6 will have polarities which are the reverse of those transmitted by those conductors when the potential of the conductor 4 is negative relative to ground. The adjustment of the capacitor $C_2$ then needed to rebalance the apparatus will decrease the capacity of that capacitor $C_2$.

In the arrangement shown in Fig. 1, the operation of the vibrator units A and B results in the simultaneous positive and negative charging of the capacitors $C_1$ and $C_2$, respectively. Vibrator units having their vibrating contacts grounded in accordance with the present invention may also be used in other capacity-rebalancing apparatus including capacitors which are similar to the capacitors $C_1$ and $C_2$, but which are not charged simultaneously or dissimilarly. One such other system is shown by way of example in Fig. 2.

Figure 2:
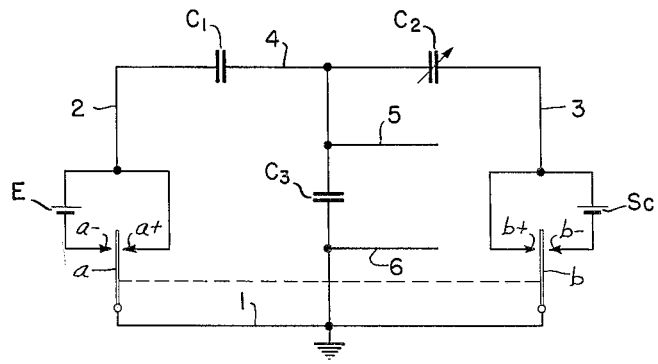
Fig. 2 is a diagram illustrating a second embodiment of the invention.

The grounded vibrating contacts or reeds $a$ and $b$ in the arrangement of Fig. 2 are shown as being mechanically coupled and vibrated in synchronism by a single driving device or coil. The latter is not shown in Fig. 2, but may well be identical to one of the coils 7 of Fig. 1. If desired, separately driven vibrator units like the units A and B of Fig. 1 may be employed in the apparatus of Fig. 2 in lieu of the commonly-driven units illustrated. Likewise, vibrator units driven by a single driving coil may be used in the Fig. 1 apparatus in lieu of the separately driven units shown. The commonly-driven vibrator units of Fig. 2 have the advantage that synchronism between the motions of the two reeds $a$ and $b$ is more easily and permanently assured than it is for the separately driven units of Fig. 1.

The Fig. 2 circuit network differs in substance from the network shown in Fig. 1, only in that in Fig. 2, the positive terminal of the voltage source Sc is connected to the conductor 3 and the vibrator contacts are so arranged that when the contact $a$ engages the contact $a-$ and thus connects the voltage source E between ground and the conductor 2, the contact $b$ engages the contact $b+$ and thus opens circuits the voltage source Sc and connects the conductor 3 and capacitor $C_2$ to ground. When the contact $a$ moves to engage the contact $a+$ and the contact $b$ moves to engage the contact $b-$, the voltage source E is open circuited, the conductor 2 and capacitor $C_1$ are connected to ground, and the standard voltage source Sc is connected between ground and the capacitor $C_2$.

Thus, with the apparatus shown in Fig. 2, the voltage source E is connected in circuit with the capacitor $C_1$ to charge the latter during half cycles of the alternating voltage supplied by supply conductors L' and L² which alternate with half cycles of that supply conductor voltage in which the voltage source Sc is connected in circuit with the capacitor $C_2$ to charge that capacitor. During the half cycles in which the capacitors $C_1$ and $C_2$ are not connected to their respective charging voltage sources, they are connected directly to the ground conductor 1 and hence are permitted to discharge through the capacitor $C_3$.

When the apparatus shown in Fig. 2 is in balance, the charges placed on the capacitors $C_1$ and $C_2$ during the alternate half cycles of the supply conductor voltage are equal and the potential on the conductor 4 rises above the potential of the conductor 1 at a frequency double that of the supply conductor voltage. The voltage pulses thus produced on the conductor 5 are transmitted by the conductors 5 and 6 to the voltage amplifying and motor driving mechanism as disclosed and claimed in said aforementioned Wills patent, for example, but are not effective to produce operation of that motor drive mechanism because of their double frequency character. No signal voltage pulses having the frequency of the supply conductor voltage are then produced on the conductor 4.

When the apparatus of Fig. 2 is unbalanced and the charge placed on one capacitor $C_1$ or $C_2$ is less than the charge placed on the other capacitor, the latter discharges through the conductor 4 through the said one capacitor and into the capacitor $C_3$ and the potential of the conductor 4 rises above the potential of the ground conductor 1 at the frequency of the supply conductor voltage. In consequence, the conductors 5 and 6 then transmit uni-directional pulses at the frequency of the supply conductor voltage to the voltage amplifier and motor driving mechanism. That mechanism is responsive to uni-directional voltage pulses of the supply conductor frequency and operates to produce balancing adjustment of the capacitor $C_2$. As in the case in which the apparatus is in balance, the potential of the conductor 4 will tend to rise above the potential of the ground conductor 1 at a frequency double that of the supply conductor voltage, but such voltage variations of the conductor 4 do not produce operation of the motor driving mechanism.

The characteristics of the voltage amplifying and motor driving mechanism which make it selectively responsive to voltage pulses of the frequency of the supply conductor voltage but unresponsive to voltage pulses of twice that frequency are explained in the Wills patent and need no further explanation herein.

Notwithstanding the operating differences between the two arrangements shown in Figs. 1 and 2, the connection of the vibrating contacts $a$ and $b$ to ground, give the same general advantages with the arrangements shown in Fig. 2 as are obtained with the arrangement shown in Fig. 1.

Figure 3:
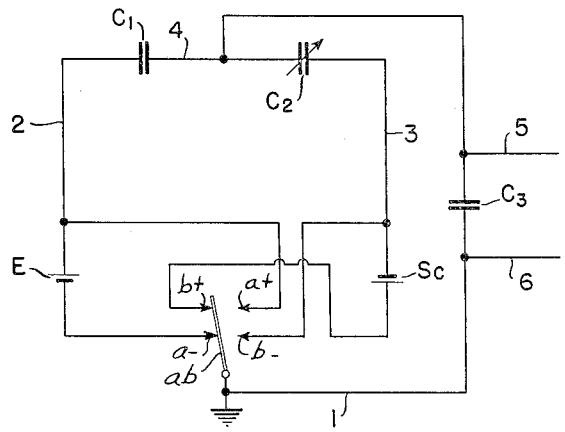
Fig. 3 is a diagrammatic representation of a modification of a portion of the apparatus shown in Fig. 1.

The switching mechanism shown in Figs. 1 and 2 may be simplified and its inherent cost may be reduced by arranging a single grounded vibrating contact to alternately connect the two terminals of each of the two voltage sources to ground. Thus, as shown, by way of example in Fig. 3, a single vibrating contact $ab$ may be arranged to vibrate between two positions, in one of which it engages one of the relatively stationary contacts of each of the voltage sources E and Sc, and in the second of which it engages the other of the relatively stationary contacts connected to the two voltage sources. The particular circuit arrangement shown by way of example in Fig. 3 differs in substance from that shown in Fig. 1 only as a result of the replacement of the two vibrating contacts $a$ and $b$ of Fig. 1 by a single vibrating contact $ab$ and the same reference symbols are used in Figs. 3 and 1, to designate corresponding circuit network elements.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. Capacity-rebalancing measuring apparatus comprising first and second measuring terminals adapted to be connected to the respective terminals of opposite polarity of a source of unknown unidirectional voltage to be measured, first and second reference terminals adapted to be connected to the respective terminals of opposite polarity of a source of substantially constant unidirectional voltage, first and second output terminals adapted to be connected to the input portion of voltage responsive means, a fixed capacitor having a substantially constant capacity, a rebalancing capacitor having a variable capacity dependent on the adjustment thereof, conductor means adapted to be connected to ground, conductors connecting said capacitors in series between said first measuring terminal and said first reference terminal, a connection between said first output terminal and the junction between said capacitors, a connection between said second output terminal and said conductor means, and switching means comprising contact means connected to said conductor means and operating means operative, when energized, to render said contact means operative to connect said first and second measuring terminals to said conductor means in rapid alternation at a predetermined rate, and to connect said first and second reference terminals to said conductor means in rapid alternation at said rate.

2. Apparatus as specified in claim 1, wherein said first measuring and first reference terminals are of opposite polarity, and wherein said contact means simultaneously connects said first measuring and first reference terminals to said conductor means during periods which alternate rapidly with others in which said contact means simultaneously connects said second measuring and second reference terminals to said conductor means.

3. Apparatus as specified in claim 1, wherein said first measuring and first reference terminals are of the same polarity, and wherein said contact means simultaneously connects said first measuring and second reference terminals to said conductor means during periods which alternate rapidly with others in which said contact means simultaneously connects said second measuring and first reference terminals to said conductor means.

4. Apparatus as specified in claim 1, wherein said contact means includes a first switching unit associated with said measuring terminals and a second switching unit associated with said reference terminals, and wherein each of said switching units includes a relatively movable contact connected to said conductor means, a first cooperating, relatively stationary contact connected to one of the associated two of said terminals, and a second cooperating relatively stationary contact connected to the other of the associated two of said terminals, said operating means being operative, when energized, to cause each of said movable contacts to engage the cooperating two of said stationary contacts in rapid alternation.

5. Apparatus as specified in claim 4, wherein said operating means comprises a single driving device common to both of said switching units.

6. Apparatus as specified in claim 4, wherein said operating means comprises a separate driving device individual to each of said switching units.

7. Apparatus as specified in claim 1, wherein said contact means includes a relatively movable contact connected to said conductor means and first and second pairs of associated relatively stationary contacts, wherein each of the contacts of said first pair is connected to a respective one of said measuring terminals, and wherein each of the contacts of said second pair is connected to a respective one of said reference terminals, said operating means being operative, when energized, to cause said movable contact to engage each of the contacts of said first pair in rapid alternation, and simultaneously to engage each of the contacts of said second pair in rapid alternation.

LEONARD STANTON.

REFERENCES CITED

The following references are of record in the file of this patent:

UNITED STATES PATENTS

| Number | Name | Date |
|---|---|---|
| 2,399,213 | Edwards | Apr. 30, 1946 |
| 2,473,542 | Philpott | June 21, 1949 |